(12) United States Patent
Avvaru et al.

(10) Patent No.: US 12,545,608 B2
(45) Date of Patent: Feb. 10, 2026

(54) SYSTEM AND METHOD FOR TREATING SPENT CAUSTIC EFFLUENT USING CHLORINE DIOXIDE SOLUTION

(71) Applicant: HPCL-Mittal Energy Limited, Bathinda (IN)

(72) Inventors: Balasubrahmanyam Avvaru, Perala (IN); Mainak Ray, Midnapore (IN); Vineet Kumar Gupta, Faridabad (IN)

(73) Assignee: HPCL-MITTAL ENERGY LIMITED, Bathinda (IN)

( * ) Notice: Subject to any disclaimer, the term of this patent is extended or adjusted under 35 U.S.C. 154(b) by 644 days.

(21) Appl. No.: 17/816,800

(22) Filed: Aug. 2, 2022

(65) Prior Publication Data

US 2023/0159359 A1 May 25, 2023

(30) Foreign Application Priority Data

Nov. 11, 2021 (IN) .............................. 202111051827

(51) Int. Cl.
| | |
|---|---|
| C02F 1/76 | (2023.01) |
| C02F 1/58 | (2023.01) |
| C02F 101/10 | (2006.01) |
| C02F 103/36 | (2006.01) |

(52) U.S. Cl.
CPC ............... *C02F 1/76* (2013.01); *C02F 1/58* (2013.01); *C02F 2101/101* (2013.01); *C02F 2103/365* (2013.01); *C02F 2209/06* (2013.01)

(58) Field of Classification Search
CPC ........ C02F 1/66; C02F 2101/101; C02F 1/36; C02F 1/76; C02F 1/58; C02F 2101/40; C02F 2103/365; C02F 2209/06

USPC ......................................................... 210/758
See application file for complete search history.

(56) References Cited

U.S. PATENT DOCUMENTS 6,576,144 B1 *  6/2003  Vineyard ................ C02F 1/725
                                                                    210/759
2017/0144908 A1 *  5/2017  Milosevic ................ C02F 1/36

FOREIGN PATENT DOCUMENTS

CN          209221878 U  *  8/2019

OTHER PUBLICATIONS

Yang et al, CN 209221878 English machine translation, pp. 1-8 (Year: 2019).*

* cited by examiner

*Primary Examiner* — Claire A Norris
(74) *Attorney, Agent, or Firm* — Perilla Knox & Hildebrandt LLP; Kenneth A. Knox

(57) ABSTRACT

The present invention generally relates to a system and method for treating spent caustic effluent using chlorine dioxide solution. The system comprises a spent caustic storage tank for receiving spent caustic obtained from refinery operations; an acid storage container connected to the spent caustic storage tank for neutralizing free alkali content with a mineral acid to eliminate unwanted chemical reactions associated with free caustic present in spent caustic with $ClO_2$; a heat exchanger unit engaged for reducing temperature of spent caustic to 35-45° C. from high temperature raised due to heat of neutralisation at least one of a cavitation (mixing) chamber or venturi mixing equipment mechanically connected downstream of the heat exchanger unit for adding $ClO_2$ solution to the spent caustic solution to oxidize sulphide/thiols content for complete reduction of sulphide/mercaptane and reduction of 80-90% of COD.

2 Claims, 13 Drawing Sheets

Experiment 1: LPG treater Merox spent caustic effluent

| Sample Name | SPENT CAUSTIC INLET (initial) | Treated spent caustic (Final) |
|---|---|---|
| Caustic Strength (Wt.%) | 3.5 | 0.2 |
| pH | 11 | 8.0 |
| Sulphide (mg/l) | 3432 | 3 |
| Mercaptide (mg/l) | 910 | ND (not detectable) |
| Phenol (mg/l) | 12 | 7 |
| COD (mg/l) | 6690 | 610 |

***Volumetric flowrate of spent caustic/ 0.1 % $ClO_2$ solution = 1

Figure 7

Experiment 2: LPG treater Merox spent caustic effluent

| Sample Name | SPENT CAUSTIC INLET (initial) (1m³/hr) | Treated spent caustic (Final) |
|---|---|---|
| Caustic Strength (Wt%) | 3.1 | 0.3 |
| pH | 12 | 8 |
| Sulphide (mg/l) | 1326 | 0 |
| Mercaptide (mg/l) | 840 | 0 |
| Phenol (mg/l) | 15 | 8 |
| COD (mg/l) | 8950 | 770 |

***Volumetric flowrate of spent caustic/ 0.1 % $ClO_2$ solution = 1

Figure 8

Experiment 3: ATF/FCC Merox spent caustic effluent

| Sample Name | SPENT CAUSTIC INLET (1m³/hr) (initial) | Treated spent caustic (Final) |
|---|---|---|
| Caustic Strength (Wt. %) | 6.7 | 0.3 |
| pH | 13.5 | 9.2 |
| Sulphide (mg/l) | 6600 | 0 |
| Mercaptide (mg/l) | 3345 | 8 |
| Phenol (mg/l) | 527 | 85 |
| COD (mg/l) | 51600 | 995 |

Volumetric flow rate of spent caustic / $ClO_2$ solution (4000 ppm) = 1

Figure 9

Experiment 4: Kero Merox spent caustic effluent

| Sample Name | SPENT CAUSTIC INLET (1m³/hr) (initial) | Treated spent caustic (Final) |
|---|---|---|
| Caustic Strength (Wt. %) | 7.1 | 0.3 |
| pH | 13.5 | 8.2 |
| Sulphide (mg/l) | 40854 | 15 |
| Mercaptide (mg/l) | 23145 | 265 |
| Phenol (mg/l) | 5527 | 285 |
| COD (mg/l) | 75600 | 6990 |

***Volumetric flow rate of spent caustic / $ClO_2$ solution (10000 ppm)= 1

Figure 10

Table 6: Comparative data of residence time for sulphide reduction WAO vs ClO2 process

| | Residence time (minutes) | Initial Sulphide (ppm) | Final Sulphide (ppm) |
|---|---|---|---|
| WAO | 120-240 | 1000-10000 | 100-300 |
| ClO$_2$ process | 5-8 | 1000-10000 | Not detectable |

Figure 12

SYSTEM AND METHOD FOR TREATING SPENT CAUSTIC EFFLUENT USING CHLORINE DIOXIDE SOLUTION

FIELD OF THE INVENTION

The present disclosure relates to advanced oxidation systems for refinery & petrochemical spent caustic effluent treatment. In more details, a system and method for treating spent caustic effluent using chlorine dioxide solution.

BACKGROUND OF THE INVENTION

Caustic towers are generally used in petrochemical and refinery plants to remove acid gases, hydrogen sulfide ($H_2S$), carbon dioxide ($CO_2$) from cracked ethylene gases, and di-sulfides/mercaptans (R—SH) from the Merox process of LPG/kerosene streams. The effluent streams coming from these caustic towers are called spent caustic effluent. These spent caustic effluent generally contains sulfur compounds (sulfides), residual hydrocarbon compounds such as phenols, cresylic acids, and naphthenic acids, these compounds contribute high COD and sulfide content. Due to the hazardous, odorous, and/or corrosive nature of spent caustic, the handling and disposal can be a challenge. Spent caustic streams may also have other characteristics that can create issues with conventional biological processes such as noxious odors, pH swings, foaming, or poor settling of biological solids. Spent caustic is having high chemical oxygen demand (COD) and high sulfide content, which is not accepted in the biological wastewater treatment plants, some of the spent caustic contaminants are not readily biodegradable. Typically the material is disposed of by high dilution with bio-treatment, acid neutralization, deep well injection, incineration, wet air, catalytic/humid peroxide oxidation, or other specialty processes. The two basic methods for treating the spent caustic solutions are practiced in modern refineries are wet air oxidation (WAO) and direct acid neutralization (DAN). The toxic characteristics of spent caustic effluent are reduced to permissional levels by these known techniques the remaining residual levels are generally treated using the biological methods.

WAO is the process of oxidizing organic matter in the presence of liquid water. Theoretically, any substance that is capable of burning can be wet oxidized in water. Wet air oxidation system oxidizes sulfide, mercaptans and reduces the COD of spent caustic. After treatment, the effluent has a lower COD and then be treated in the biological methods. The oxidation reactions are performed at elevated temperatures requiring a pressurized system to control evaporation. Depending on the impurity profile the temperature and pressure conditions used in the wet air oxidation are categorized into three i.e. low, mild, and high-temperature wet air oxidation systems. To treat the refinery spent caustics the required operating conditions are becoming high due to processing of opportunity crudes, the observed high sulfide content may require extremely high temperature and pressure conditions in WAO. Hence the corresponding OPEX & CAPEX requirement was also high. However, the treated effluent still contains residual hydrocarbons, high sulfide, and inconsistency in the measured COD values has been observed. Because of these parameters, the requirement of an efficient spent caustic treatment method is need of the hour to the refiner.

In the view of the forgoing discussion, it is clearly portrayed that there is a need to have a system and method for treating spent caustic effluent using chlorine dioxide solution.

SUMMARY OF THE INVENTION

The present disclosure seeks to provide an alternative to wet air oxidation system and method for treating spent caustic effluent using an strong oxidizing agent such as chlorine dioxide solution.

In an embodiment, a system for treating spent caustic effluent using chlorine dioxide solution is disclosed. The system includes a spent caustic storage tank for receiving spent caustic obtained from refinery operations. The system further includes an acid storage container connected to the spent caustic storage tank for neutralizing free alkali content with a mineral acid to eliminate unwanted chemical reactions associated with the free caustic present in the spent caustic with ClO2 solution. The system further includes a heat exchanger unit engaged with the acid storage container through a pipeline for reducing temperature of the neutralized spent caustic to 35-45° C. The system further includes at least one of a cavitation (mixing) chamber or venturi mixing equipment mechanically connected downstream to the heat exchanger unit for adding $ClO_2$ solution to the spent caustic solution to oxidize sulphide/thiols content for complete reduction of sulphide/mercaptane and reduction of 80-90% of COD. Thereafter the treated effluent is sent to an ETP biological treatment unit configured for treating resultant solution by employing biological treatment process for complete removal of COD.

In an embodiment, the required chemical oxidant is less than 0.63 gm per 1 gm of sulfide reduction and residence time required for reduction of sulfide content is less than 5 minutes.

In an embodiment, the biological treatment is performed under normal room temperature and atmospheric pressure conditions.

In an embodiment, the sulphides and mercaptanes are oxidized to sulphonic and sulphoxide for eliminating problems associated with the sulfides in biological water treatment processes.

In another embodiment, a method for treating spent caustic effluent using chlorine dioxide solution is disclosed. The method includes neutralizing free alkali content with a mineral acid to eliminate unwanted chemical reactions in spent caustic. The method further includes reducing temperature of spent caustic to 35-45° C. using a heat exchanging method. The method further includes adding $ClO_2$ solution to the spent caustic solution through at least one of a cavitation (mixing) chamber or venturi mixing equipment to oxidize sulphide/thiols content for complete reduction of sulphide/mercaptane and reduction of 80-90% of COD.

In an embodiment, the alkali neutralization is carried out till the pH comes in the range of 9-10 from initial pH of 11-13 of spent caustic effluent.

In an embodiment, the mineral acid is selected from one of a $H_2SO_4$ or HCl acid.

In an embodiment, the $ClO_2$ is mixed thoroughly with the spent caustic solution under cavitation turbulent conditions.

An object of the present disclosure is to develop advanced oxidation system is one such technology that attracts refiners for treating the spent caustic effluent.

Another object of the present disclosure is to facilitate chemical oxidant requirement less than 0.63 gm per 1 gm of sulfide reduction.

Another object of the present disclosure is to require residence time less than 5 minutes for reduction of sulfide content.

Another object of the present disclosure is to treat the refinery spent caustic effluent generated from the refinery LPG/Kero/ATF Merox process.

Yet another object of the present invention is to replace the WAO process with simple mixing of $ClO_2$ after its free caustic neutralization, hence eliminating the high capital expenditure and operating cost associated with the WAO system.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein:

FIG. 7 illustrates Table 1 depicts plant trial 1 of LPG treater spent caustic effluent in accordance with an embodiment of the present disclosure;

FIG. 8 illustrates Table 2 depicts plant trial 2 of LPG treater spent caustic effluent in accordance with an embodiment of the present disclosure;

FIG. 9 illustrates Table 3 depicts plant trial of ATF/FCC Merox Spent caustic effluent in accordance with an embodiment of the present disclosure;

FIG. 10 illustrates Table 4 depicts plant trail of Kero Merox Spent caustic effluent in accordance with an embodiment of the present disclosure;

FIG. 12 illustrates Table 6 depicts comparative data of residence time for sulphide reduction WAO vs $ClO_2$ process in accordance with an embodiment of the present disclosure.

Figure 1:
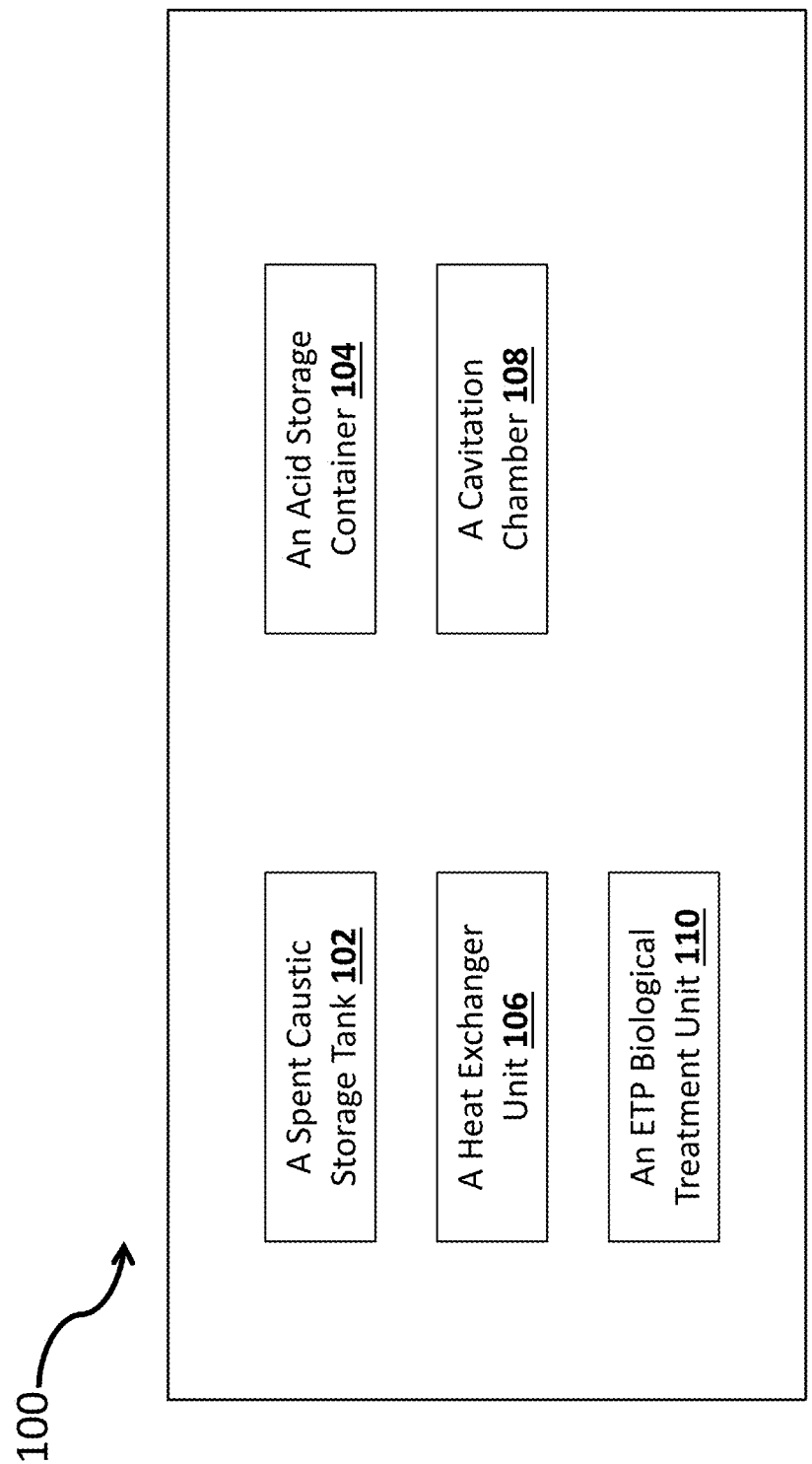
FIG. 1 illustrates a block diagram of a system for treating spent caustic effluent using chlorine dioxide solution in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises". "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Unless otherwise defined, all technical and scientific terms used herein have the same meaning as commonly understood by one of ordinary skill in the art to which this invention belongs. The system, methods, and examples provided herein are illustrative only and not intended to be limiting. Embodiments of the present disclosure will be described below in detail with reference to the accompanying drawings.

Referring to FIG. 1, a block diagram of a system for treating spent caustic effluent using chlorine dioxide solution is illustrated in accordance with an embodiment of the present disclosure. The system 100 includes a spent caustic storage tank 102 for receiving spent caustic obtained from refinery operations. The spent caustic is obtained by a Merox process of the refinery operations and it is having high pH (pH>12).

In an embodiment, an acid storage container 104 is connected to the spent caustic storage tank for neutralizing free alkali content with a mineral acid to eliminate unwanted chemical reactions associated with the free alkali present in the spent caustic with $ClO_2$ solution. The neutralization is performed for reducing amount of $ClO_2$ consumption. In an embodiment, a heat exchanger unit 106 is engaged with the acid storage container through a pipeline for reducing temperature of spent caustic to 35-45° C. the heat of neutralization during neutralization step causes the temperature of the resultant effluent to increase.

In an embodiment, at least one of a cavitation (mixing) chamber or venturi mixing equipment 108 is mechanically connected downstream of the heat exchanger unit for adding $ClO_2$ solution to the spent caustic solution to oxidize sulphide/thiols content for complete reduction of sulphide/mercaptane and reduction of 80-90% of COD. In another embodiment, the required chemical oxidant is less than 0.63 gm per 1 gm of sulfide reduction and residence time required for reduction of sulfide content is less than 5 minutes.

In another embodiment, the spent caustic effluent collected from the Merox process of the refinery is having a sulfide content in the range of 1500-50000 ppm. In another embodiment, the biological treatment is performed under normal room temperature and atmospheric pressure conditions. In another embodiment, the sulphides and mercaptanes are oxidized to sulphonic and sulphoxide for eliminating problems associated with the sulfides in biological water treatment processes.

In another embodiment, the $ClO_2$ process does not require high temperature & pressure conditions as required in the case of WAO. Hence the auxiliary equipment required for increasing the temperature & pressure i.e., steam producing equipment, boiler & pressure increasing equipment, air compressors are not required. All the equipment such as heat exchanger for heating & cooling the effluent is not required in the newly developed process. The main reactor for maintain the required residence time is not required in the $ClO_2$ treatment process. The mixing of $ClO_2$ solution with the spent caustic can be carried out in the pipeline system using the online cavitation device (venturi) as a mixing device. The elimination of all these equipment reduces the capex & opex of the process to minimum and negligible compared to WAO.

Figure 2:
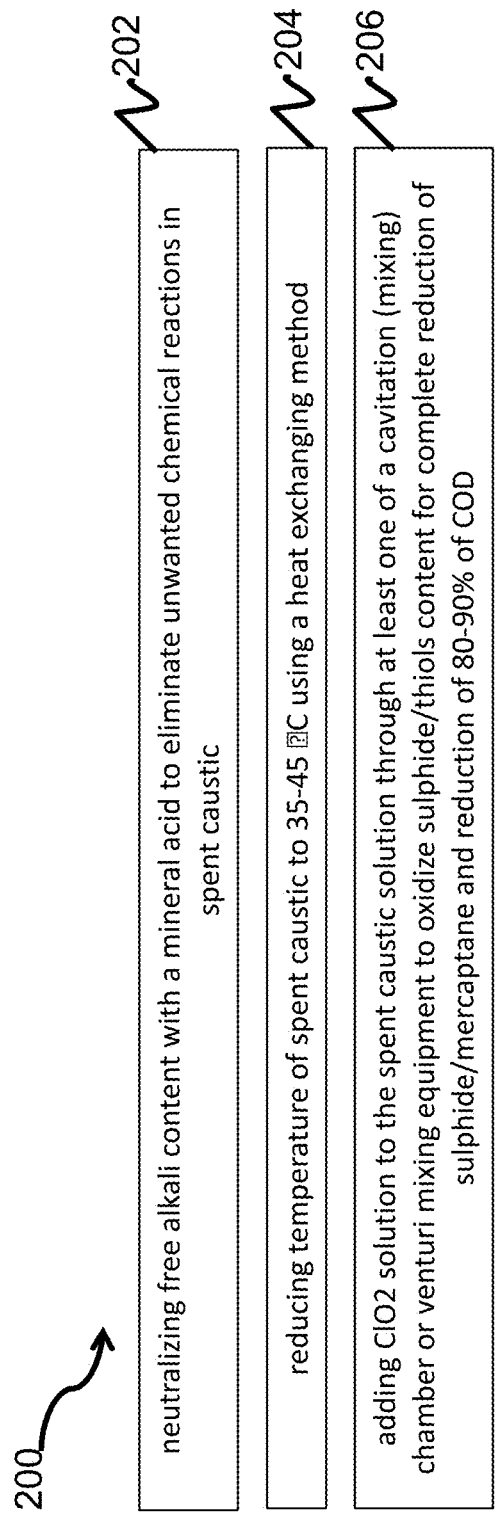
FIG. 2 illustrates a flow chart of a method for treating spent caustic effluent using chlorine dioxide solution in accordance with an embodiment of the present disclosure.

FIG. 2 illustrates a flow chart of a method for treating spent caustic effluent using chlorine dioxide solution in accordance with an embodiment of the present disclosure. At step 202, the method 200 includes neutralizing free alkali content present in the spent caustic with a mineral acid to eliminate unwanted ClO2 consumption by free alkali content present in the spent caustic. The neutralization is performed for reducing amount of $ClO_2$ consumed for spent caustic treatment.

At step 204, while during caustic neutralisation heat of neutralisation causes the temperature of spent caustic to raise to 50-60° C., the method 200 includes reducing temperature of spent caustic to 35-45° C. using a heat exchanging method.

At step 206, the method 200 includes adding $ClO_2$ solution to the spent caustic solution through at least one of a cavitation (mixing) chamber or venturi mixing equipment to oxidize sulphide/thiols content for complete reduction of sulphide/mercaptane and the oxidation of various hydrocarbons which reduces 80-90% of COD of spent caustic.

In another embodiment, the spent caustic coming from the Merox process of the refinery operations are having more than 12 pH.

In another embodiment, the alkali neutralization is carried out till the pH comes in the range of 9-10.

In another embodiment, during the neutralization causes the temperature of spent caustic to increase more than 60° C.

In another embodiment, the mineral acid is selected from one of a $H_2SO_4$ or HCl acid.

In another embodiment, the ClO is mixed thoroughly with the spent caustic solution under cavitation turbulent conditions.

Figure 3:
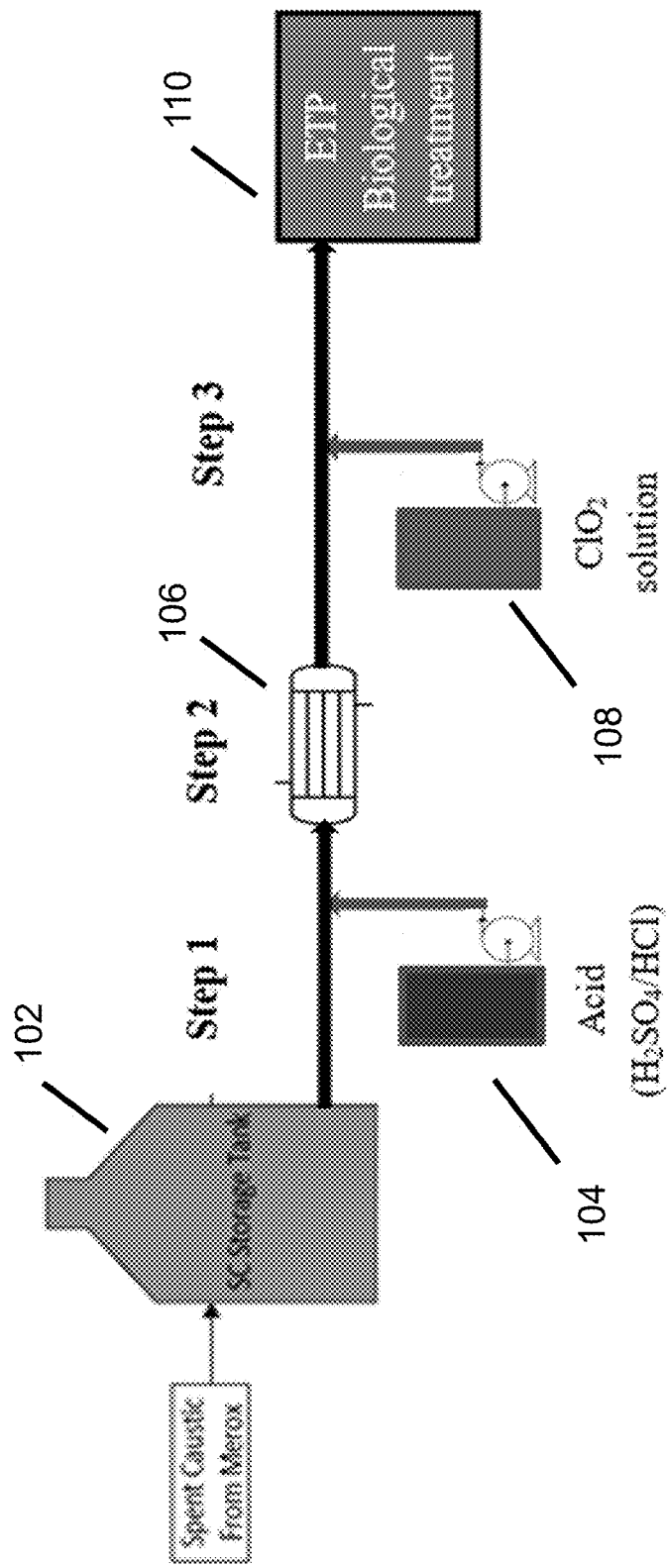
FIG. 3 illustrates a process plant configuration for treating the spent caustic in accordance with an embodiment of the present disclosure.

FIG. 3 illustrates a process plant configuration for treating the spent caustic in accordance with an embodiment of the present disclosure. Spent caustic effluent collected from the Merox process of the refinery is having a sulfide content in the range of 1500-50000 ppm. Experiments (plant trials) are conducted on spent caustic effluent having various concentration of sulphide content in the range of 5000-40850 ppm. The treated effluent is acceptable to inlet specification of the biological treatment process.

Plant trials have been conducted at commercial scale operation; 1356 ppm of initial sulfide content of the spent caustic is reduced to nil sulfide content under simple mixing of chlorine dioxide solution containing 0.1% of $ClO_2$ solution. The operation is carried out under normal room temperature and atmospheric pressure conditions. These trials are reconfirmed with some more plant trials and consistently reduced the sulfide to zero content. The overall economics of the process seems highly encouraging compared to WAO's operating cost.

Chlorine dioxide is a strong oxidizing agent, which is generally used as an alternative to chlorine gas as a water disinfection agent in the water treatment process. Its selective reactivity makes chlorine dioxide a powerful non-chlorinating oxidizing agent useful in many wastes water treating applications. Unlike most oxidants, chlorine dioxide can be used over a broad pH range to oxidize industrial odour-causing compounds. Similarly, chlorine dioxide reacts with organic sulphides and disulphides, destroying the original odour. Sulphides and mercaptanes are oxidized to next oxidation levels such as sulphonic and sulphoxides, hence eliminating the problems associated with the sulphides in biological water treatment processes.

Spent Caustics are classified into three general categories: Sulfidic, Cresylic, and Naphthenic. Sulfidic spent caustics produced from the Caustic scrubbing of Ethylene or LPG (light petroleum gas) products contain high concentrations of Sulphides and Mercaptans. Cresylic spent caustic, generated when scrubbing Gasoline produced by Fluidized Bed Catalytic Cracking processes with Caustic containing high concentrations of organic compounds including Phenols and Cresols. This type of Spent Caustic may also contain Sulphides and Mercaptans. Naphthenic Spent Caustic produced from the Caustic scrubbing of Kerosene products contain high concentrations of Polycyclic and Aliphatic organic compounds such as Naphthenic Acids. Refinery Spent Caustic is recognized as a hazardous stream given a range of characteristics, highly corrosive Sulphides, and Mercaptans, which give rise to fouling or metallurgical damage in refinery equipment. Furthermore, there is no available route for converting Spent Caustic into a valuable product. Adequate effluent treatment procedures are therefore required for its safe disposal.

Refinery operates the process units for treating LPG, Kerosene streams, and LPG from FCCU, the likely components of Spent Caustic typically contain acid compounds such as Sulphides, Thiols, Disulphides, and Polycyclic Naphthenic Acids to some extent Phenolic compounds also present. RSH, RSSR, where R can be Aliphatic and Aromatic (naphthenic groups), since these compounds are extracted with caustic media, they generally dissociate (pH>pKa) and form the Sodium salt of hydrocarbons. i.e., $Na_2S$, NaSH, and RS.Na (where R can be aliphatic and/or aromatic).

Process Step 1:

The spent caustic obtained from Merox process of the refinery operations are having high pH (>12), free caustic is present. To reduce the amount of $ClO_2$ consumption by below chemical reaction [1], is it advised to neutralize the free alkali content with any mineral acids such as $H_2SO_4$ or HCl acid. This alkali neutralization is carried out till the pH comes in the range of 9-10. This neutralization step eliminate the following reaction [1], and hence overall $ClO_2$ consumption can be reduced for sulphide reduction process mentioned in the step 3.

$$2ClO_2 + 2NaOH \rightarrow NaClO_2 + NaClO_3 + H_2O \quad [1]$$

Process Step 2:

During the neutralization process heat of neutralization is generated, this could increase the temperature of spent caustic to high (>60° C.), it is advisable to reduce the temperature to 35-45° C. using any heat exchanging methods known in the art.

Process Step 3:

It is recommended to add the $ClO_2$ solution (concentration 500-4000 ppm) to the spent caustic solution through a cavitation (mixing) chamber or venturi mixing equipment, under cavitation turbulent conditions the $ClO_2$ is mixed thoroughly and completely with the spent caustic solution, there by the sulphide/thiols content are oxidized, this makes the complete reduction of sulphide/mercaptane and 80-90% of COD reduction can be achieved. The resultant solution can be sent to ETP operation for biological treatment process for final (complete) removal of COD. The below mentioned chemical reactions shows the oxidation path way of sulphides & thiols.

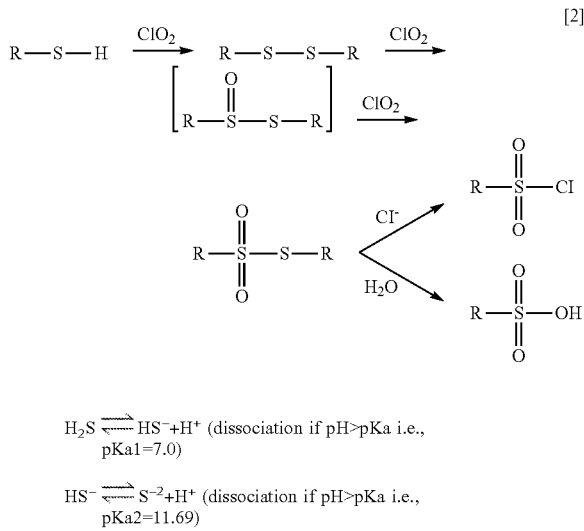

[2]

$H_2S \rightleftharpoons HS^- + H^+$ (dissociation if pH>pKa i.e., pKa1=7.0)

$HS^- \rightleftharpoons S^{-2} + H^+$ (dissociation if pH>pKa i.e., pKa2=11.69)

i.e., $H_2S$ at high pH conditions (>11.69) will be in the form $Na_2S$.

Similarly, Mercaptanes in the form R.S.Na (i.e., sodium salt of mercaptanes, if pH>12.8).

Experiment (Plant trial) 1 for LPG treater spent caustic effluent is shown in the FIG. 7. Experiment (plant trial) 2 of LPG treater spent caustic effluent is shown in the FIG. 8. Experiment (plant trial) 3 of ATF/FCC Merox Spent caustic effluent is shown in the FIG. 9. Experiment (plant trial) 4 of Kero Merox Spent caustic effluent is shown in the FIG. 10.

The following reaction chemistry is mentioned and same has been proposed for the sulfide oxidation of treated Spent Caustic effluent, the chemical reaction for the same is shown in the equation (2).

Figure 11:
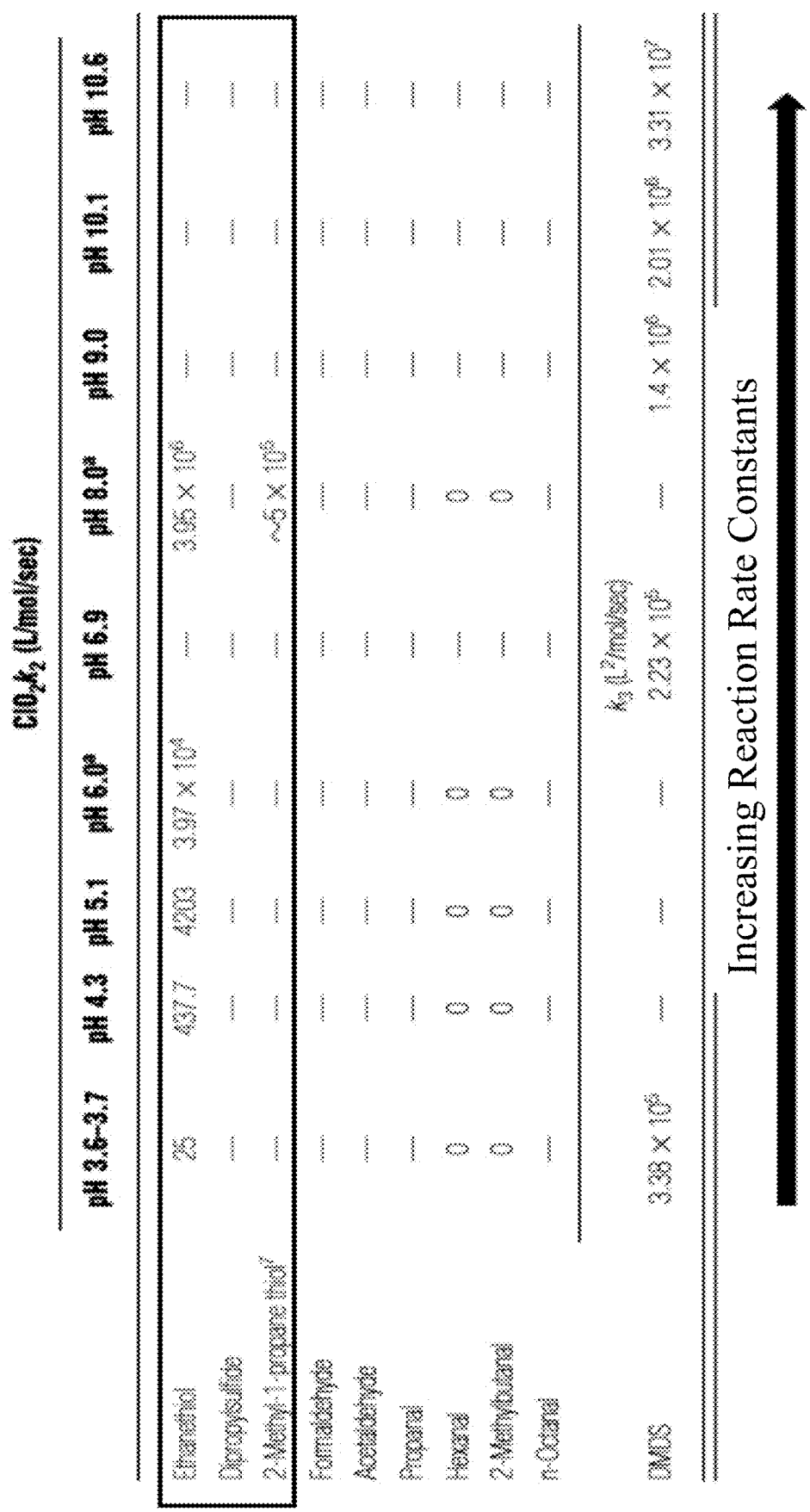
FIG. 11 illustrates Table 5 depicts the literature reported reaction rate constants of various sulphide & thiols in accordance with an embodiment of the present disclosure.

From the above-proposed reaction, it is clearly understood that Thiols, Disulfides get oxidized to Sulphones and then to Sulfonyl Chloride and/or Sulphonic acids and finally to $SO_2$ compounds. These oxidized compounds may not hamper the biological treatment processes and these are easily bio-degradable compounds. The reported reaction rate constants are very high under Alkali conditions (pH>12). The reported reaction rate constants of typical organic Thiols & Disulphide compounds with $ClO_2$ under various pH conditions have been mentioned in the FIG. 11. Because thiols can dissociate at high pH conditions (if pH>pKa), it is reasonable to expect that the reaction rate constant is a function of both the concentration of the protonated and dissociated form of Thiols. The exponential increase in the overall rate constant with an increase in pH suggests that the dissociated form of Thiols reacts at a much higher rate than the protonated form.

Figure 4:
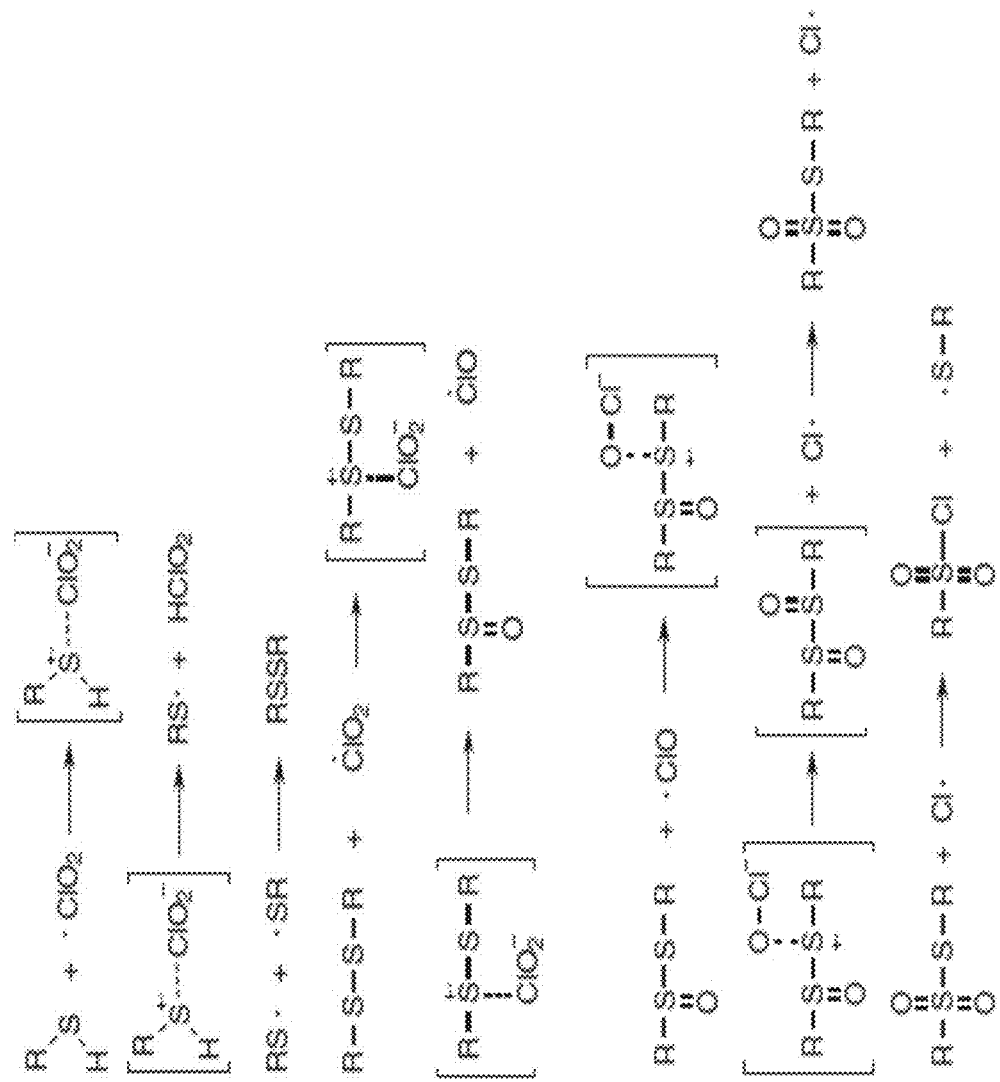
FIG. 4 illustrates a reaction mechanism of Thiols & Disulfide oxidation with $ClO_2$ in accordance with an embodiment of the present disclosure.

FIG. 4 illustrates a reaction mechanism of Thiols & Disulfide oxidation in accordance with an embodiment of the present disclosure. Apart from the above-mentioned main reaction, there can be several unknown chemical reactions, which may consume $ClO_2$. Among all other chemical reactions, the main parallel chemical reaction is mentioned below:

$$2ClO_2 + 2NaOH \rightarrow NaClO_2 + NaClO_3 + H_2O \quad (1)$$

This reaction is of prime importance, because of higher concentration of free NaOH available in the spent caustic can react with $ClO_2$ and forms Sodium Chlorite ($NaClO_2$) & Sodium Chlorate ($NaClO_3$). However, this reaction can be eliminated by neutralizing the free caustic present in the spent caustic by any using any mineral acid such as $H_2SO_4$ or HCl. By neutralization, the free caustic, the above-mentioned reaction is eliminated to some extent.

Figure 5A:
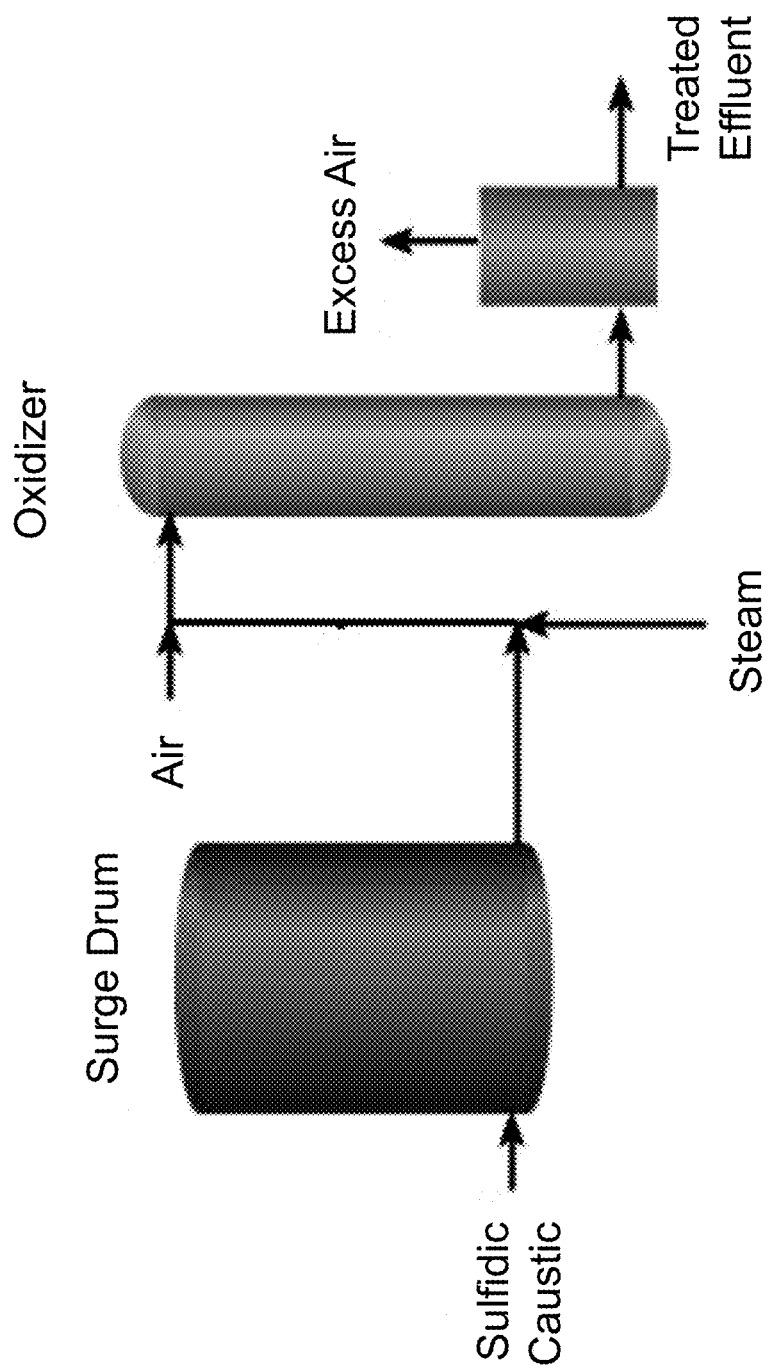
FIG. 5A illustrates Conventional wet air oxidation process scheme and FIG. 5B illustrates process flow diagram.
Figure 5B:
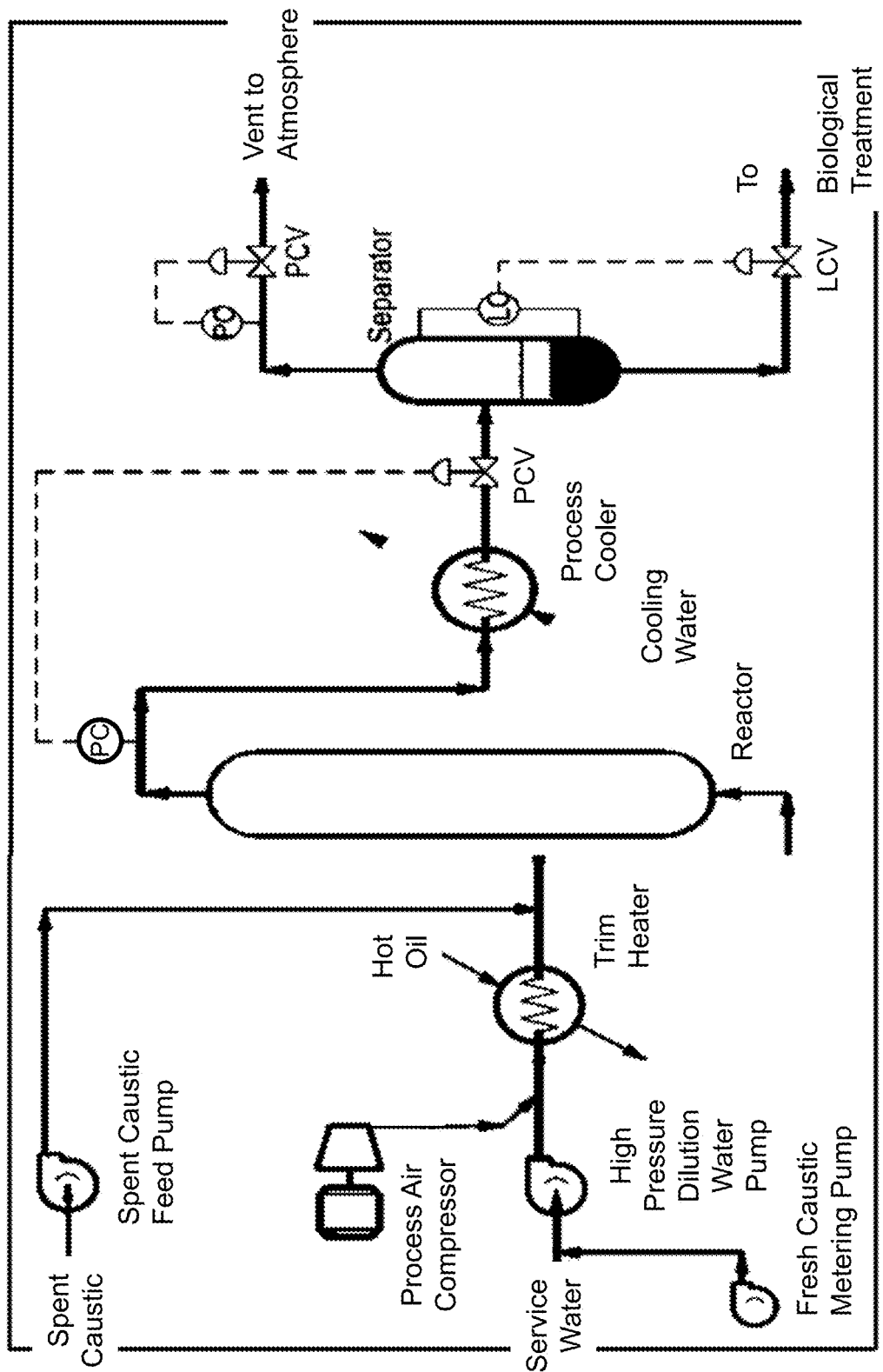

FIGS. 5A and 5B illustrate a simplified schematic diagram of WAO process in accordance with an embodiment of the present disclosure. WAO (wet Air Oxidation) is the process of oxidizing organic matter in the presence of liquid water. Wet air oxidation system oxidizes sulfide, mercaptans and reduces the COD of spent caustic. After treatment, the effluent has a lower COD and then be treated in the biological methods. The oxidation reactions are performed at elevated temperatures (120-300° C.) requiring a pressurized system (10-100 kg/cm2) to control the evaporation and oxidation. Depending on the impurity profile the temperature and pressure conditions used in the wet air oxidation are categorized into three i.e. low, mild, and high-temperature wet air oxidation systems. To treat the refinery spent caustics the required operating conditions are becoming high due to processing of opportunity crudes, the observed high sulfide content may require extremely high temperature and pressure conditions in WAO. Hence the corresponding OPEX & CAPEX requirement is also high. However, it is observed that the treated effluent still contains residual hydrocarbons, high sulfide, and inconsistency in the measured COD values.

The developed $ClO_2$ process is simple and easy to implement to refinery scale. The residence time of spent caustic is in few minutes v/s hours of WAO. The residual spent caustic (treated spent caustic) sulphide/mercaptane content is negligible or zero. WAO treated effluent contains residual sulphide content in the range 50-100 ppm. ClO, treatment process can be conducted at room temperature and pressure conditions. Process is environmentally benign compared to high temperature and pressure WAO process. High sulphide content effluent requires extreme conditions of high temperature and pressure in WAO (i.e., temperature >270° C., pressure>100 kg/cm), these extreme conditions are considered as process hazard. WAO process needs pH adjustment with acids to bring the pH to neutral, before sending the treated effluent for biological process treatment.

Residence time required for complete reduction of sulphide/thiols removal through ClO2 process is in the range of few minutes (2-5 minutes), the reaction rate constant of reaction of ClO2 with various sulphide compounds are shown in the below table 5. These reaction rates considerably high at high pH conditions, hence residence time required for complete reduction of impurities are very low as compared to the hours of residence time required for WAO process. The relative comparative residence time data is shown in the FIG. 12.

Figure 6:
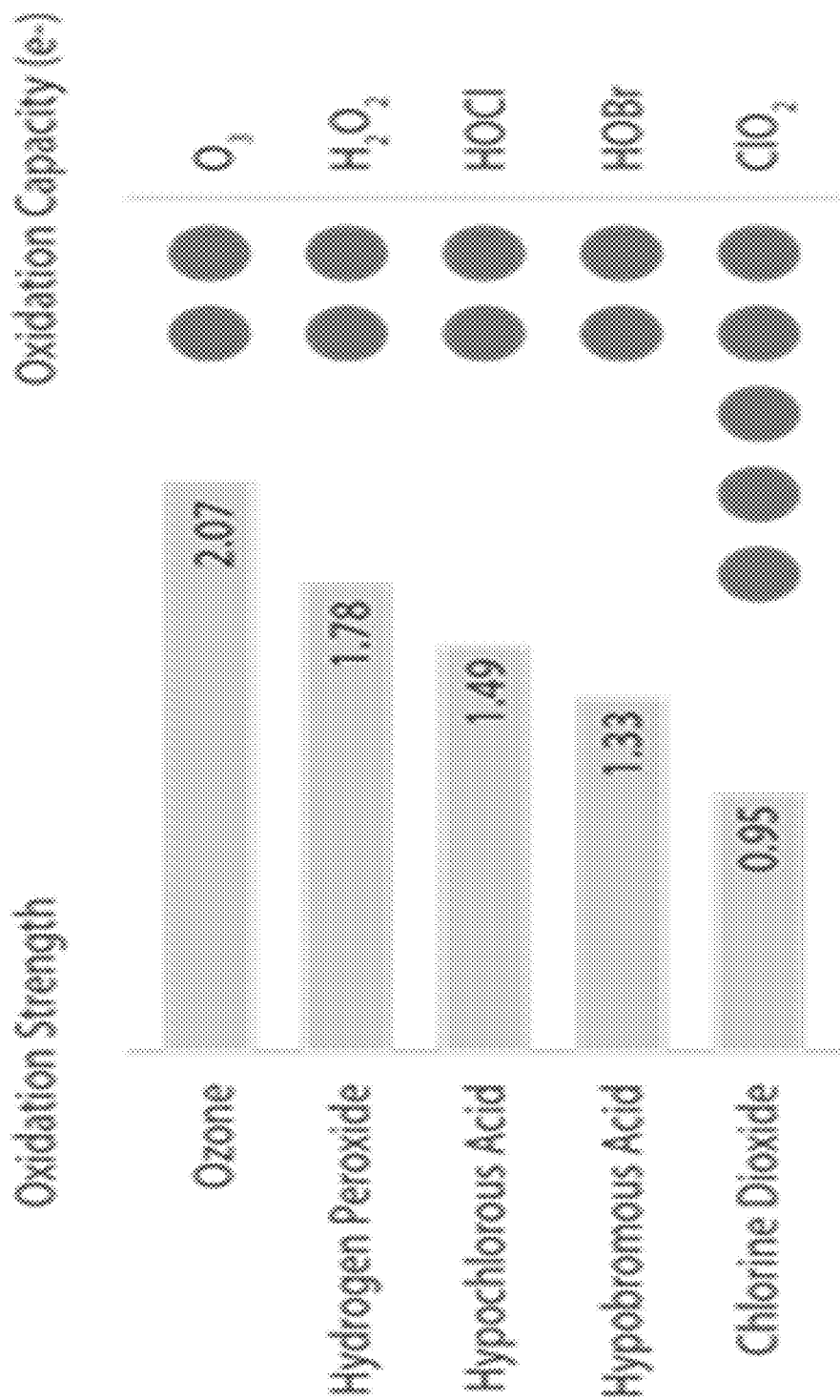
FIG. 6 illustrates oxidation strength & Oxidation capacity ($e^-$) of various oxidizing agents in accordance with an embodiment of the present disclosure.

FIG. 6 illustrates oxidation strength & Oxidation capacity ($e^-$) of various oxidizing agents in accordance with an embodiment of the present disclosure. The relative high oxidation capacity of $ClO_2$ −5, makes it more oxidation capacity than any other available oxidising agents. As an oxidizer chlorine dioxide is very selective. It has this ability due to its unique one-electron exchange mechanisms. Unlike other oxidising agents (i.e., $H_2O_2$, Chlorine, Ozone), Chlorine dioxide attacks specifically the electron-rich centres of organic molecules such as sulphide and thiols. Other oxidising agents reacts/oxidises vigorously with other available compounds and forms various addition/side products.

By comparing the oxidation strength and oxidation capacity of different oxidising agents, one can conclude that chlorine dioxide is effective at low concentrations. Chlorine dioxide is not as reactive as ozone or chlorine and it only reacts with sulphur compounds, amines and some other reactive organic substances. In comparison to chlorine and ozone, a very less amount of chlorine dioxide is needed to get the desired oxidation.

The oxidation strength describes how strongly an oxidizer reacts with an oxidizable substance. Ozone has the highest oxidation strength and reacts with every substance that can be oxidized. Chlorine dioxide is weak, it has a lower potential than hypochlorous acid or hypobromous acid. The oxidation capacity shows how many electrons are transferred at an oxidation or reduction reaction. The chlorine atom in chlorine dioxide has an oxidation number of +4. For this reason, chlorine dioxide accepts 5 electrons when it is reduced to chloride ($Cl^-$). This is more than 2.5 times the oxidation capacity of chlorine.

Chlorine dioxide reacts with organic sulphides instantaneously at alkaline conditions, oxidises the thiols (mercaptane) to the respective sulphonic acid or sulphone compound (destroying the mercaptan odour). Similarly, Chlorine dioxide reacts with organic sulphides and disulphides destroying the original odour.

$ClO_2$ can be produced using the sodium chlorite and HCl as reactants, this industrial process eliminates the handling of Chlorine gas. High concentration of Chlorine dioxide gas is explosive in nature; hence it is produced in dilute concentrations, not more than 10%. Chlorine dioxide is a very unstable substance, when it comes in contact with sunlight, it decomposes to Chlorine and oxygen. It is recommended to produce the $ClO_2$ at the site itself. Industrial production units are well conversant to produce and handling the $ClO_2$.

In the disclosed method, the recommended usage of $ClO_2$ concentration is in the range of 1000-4000 ppm (i.e., 0.1-0.4%). This concentration of $ClO_2$ do not pose any process threat. Chlorine dioxide is about 5 to 10 times more expensive than chlorine. The costs of $ClO_2$ (chlorine dioxide) depend upon the price of the chemicals ($NaClO_2$) that are used to produce chlorine dioxide.

Advanced oxidation technique is one such technology that has attracted the refiners for treating the spent caustic effluent. Several literature reports have been reported to solve this issue, however, these inventions have not been able to provide the economical solution to the problem. The high oxidation capacity of ClO2 makes it low dosages levels needed for the desired oxidation reaction. Hence the overall economics of the process makes it more attractive. Prior alkali neutralization with the mineral acid step makes the overall process more attractive and economically viable to implement the same to refinery operations.

Alternative Oxidants generally used for spent caustic treatment:

Hydrogen Peroxide (Humid Peroxide) does not destroy sulphides, Phenol, and mercaptans, and phenols unless under catalytic conditions and with high-temperature conditions.

Chlorine is an oxidant that reacts with sulphide and hydrocarbons. However, it produces the halogenated by-products, being a hazardous chemical its use in industrial applications is restricted.

Chlorine Dioxide (Advantages):

$ClO_2$ oxidation generally proceeds via an electron transfer pathway i.e., chlorine substitution rarely occurs during $ClO_2$ oxidation.

Chlorine dioxide reacts more rapidly and completely than other available oxidizers.

Chlorine dioxide does not require pH adjustment and does not increase solids loading.

Chlorine dioxide does not form Tri halo methane's.

The reaction kinetics are too fast, and the residence time required is a few minutes, complete reduction of sulfide is achieved at room temperature & pressure conditions.

No requirement for a special type reactor arrangement, a simple pipeline (plug flow) with venturi design for charging ClO2 is good enough for complete sulphide reduction.

An alternative technology for WAO

Challenges with $ClO_2$:

Handling of Chlorine gas for generating $ClO_2$.

Alternatively, $ClO_2$ can be generated through HCl route as well.

The disclosed system can be used for treating the refinery spent caustic effluent generated from the refinery LPG/Kero/ATF Merox process. The same principle can be applied to the petrochemical spent caustic effluent generated from the steam cracking process. These effluents are also named spent caustic and contain simple compounds such as acid gases, $H_2S$ (sulfides), mercaptans, and other low molecular weight hydrocarbon compounds. These spent caustic effluent streams are generally treated in WAO (wet air oxidation) process. The present invention can replace the WAO process with simple mixing of $ClO_2$ after its free caustic neutralization, hence eliminating the high capital expenditure and operating cost associated with the WAO system.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method for treating a spent caustic effluent using a chlorine dioxide solution, comprising:
   neutralizing free alkali content with a mineral acid to eliminate unwanted chemical reactions in the spent caustic effluent, wherein the mineral acid is selected from one of a $H_2SO_4$ or HCl acid and comprises sulphides and mercaptans, wherein the neutralizing causes a temperature of the spent caustic effluent to increase to 50°-60° C., and the neutralizing is carried out until a pH of the spent caustic effluent is in a range of 9-10;
   reducing the temperature of the spent caustic effluent to 35-45° C. from 50°-60° C. using a heat exchanging method;
   adding a $ClO_2$ solution at a concentration of 500-4000 ppm to the spent caustic effluent through a venturi mixing equipment to oxidize sulphide and thiols content for complete reduction of the sulphide and mercaptane and for reduction of 80-90% of Chemical Oxygen Demand (COD), wherein the $ClO_2$ solution added is less than 0.63 gm per 1 gm of sulfide reduction, and wherein a residence time in which the caustic effluent is in contact with the $ClO_2$ solution is less than five minutes; and
   treating the spent caustic solution by employing a biological treatment process for complete removal of the COD, wherein the biological treatment process is performed under normal room temperature and atmospheric pressure conditions.

2. The method as claimed in claim 1, wherein the $ClO_2$ solution is mixed with the spent caustic solution under cavitation-induced turbulent conditions.

* * * * *